July 10, 1956  E. J. VEVERKA  2,753,752
LENS ADAPTER
Filed Dec. 29, 1953
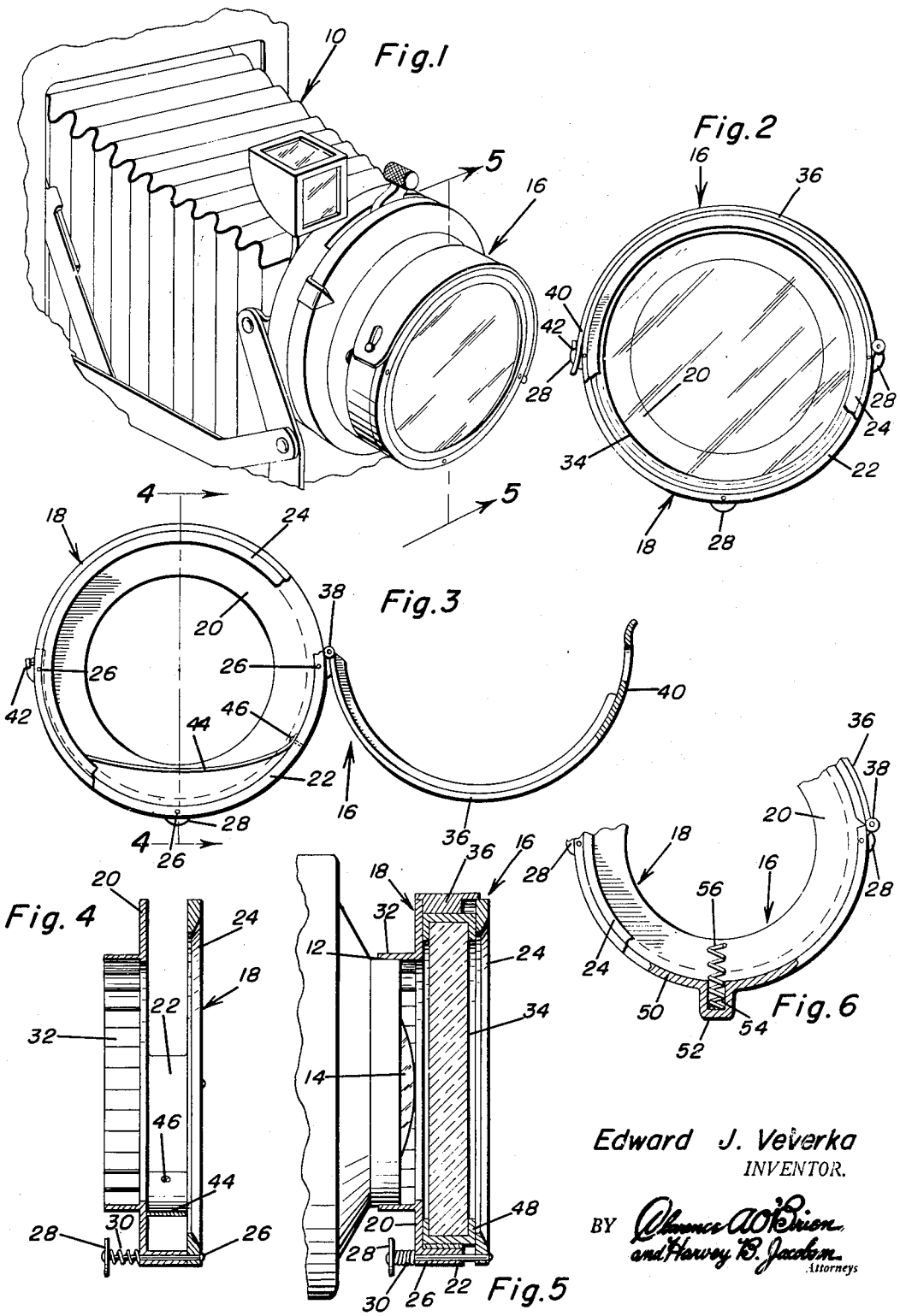
Edward J. Veverka
INVENTOR.

United States Patent Office 2,753,752
Patented July 10, 1956

2,753,752

LENS ADAPTER

Edward J. Veverka, Chicago, Ill.

Application December 29, 1953, Serial No. 400,841

1 Claim. (Cl. 88—1)

This invention relates in general to improvements in lens adapters, and more specifically to a lens adapter which may be essentially considered a one-piece construction.

The primary object of this invention is to provide an improved lens adapter for cameras which includes a hingedly mounted cover portion which may be easily and quickly moved to open position whereby lenses carried by the lens adapter may be quickly and easily removed.

Another object of this invention is to provide an improved lens adapter which is so constructed and arranged whereby lenses of various thicknesses may be conveniently mounted therein.

A further object of this invention is to provide an improved lens adapter for receiving auxiliary lenses and filters, the lens adapter being so constructed whereby lenses and filters may be conveniently removed therefrom without one's fingers touching the surfaces of the lenses or filters.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of the front portion of a camera and shows mounted on the lens housing thereof the lens adapter which is the subject of this invention;

Figure 2 is an enlarged front elevational view of the lens adapter, a portion of the front wall of the lens portion being broken away in order to clearly illustrate the relationship of a lens mounted therein;

Figure 3 is a front elevational view of the lens adapted of Figure 2 with the cover portion of the lens adapter being in an open position and the lens being removed therefrom, a portion of the front wall of the lens adapter being broken away and shown in section in order to clearly illustrate the manner in which a leaf spring is mounted therein;

Figure 4 is an enlarged transverse vertical sectional view taken substantially upon the plane indicated by the section line 4—4 of Figure 3 and shows the manner in which the front wall of the lens adapter is guidingly mounted for forward and rearward movement and is rearwardly urged by a spring means;

Figure 5 is an enlarged fragmentary transverse vertical sectional view taken through the lens adapter along the line 5—5 of Figure 1 and shows the general relationship of the lens adapter and an adjoining lens mounted therein; and Figure 6 is an enlarged fragmentary front elevational view of a slightly modified form of lens adapter and shows a modified form of spring for urging the removal of lenses mounted in the lens adapter.

Referring now to the drawings in detail, it will be seen that there is illustrated in Figures 1 and 5 a conventional camera which is referred to in general by the reference numeral 10. The camera 10 includes a lens housing 12 which has mounted therein the main lens 14 of the camera. Removably secured to the lens housing 12 is the lens adapter which is the subject of this invention, the lens adapter being referred to in general by the reference numeral 16.

The lens adapter 16 includes a housing which is referred to in general by the reference numeral 18. The housing 18 is formed by an annular rear wall 20 which has projecting forwardly therefrom along the lower portion thereof an integral fixed circumferential portion 22. The housing 18 also includes a separate annular front wall 24. The annular front wall 24 is guidingly mounted relative to the rear wall 20 and the circumferential portion 22 by a plurality of guide pins 26 which have their forward ends rigidly secured to the front wall 24 and which pass rearwardly through the circumferential portion 22. The rear ends of the guide pins 26 are provided with collars 28 against which abut coil springs 30. The coil springs 30 have their forward ends in abutting relation with the rear wall 20. It will thus be seen that the front wall 24 is mounted for guided forward and rearward movement and that it is spring urged rearwardly.

In order that the housing 18 may be conveniently mounted on the lens ring 12, the rear wall 20 thereof is provided with a rearwardly extending adapter ring 32. The adapter ring 32 is of the split type and resiliently engages over the lens housing 12 to facilitate the mounting and removal of the lens adapter 16.

From the foregoing description of the housing 18, it will be seen that the upper portion thereof between the front wall 24 and the rear wall 20 is open. This portion of the housing 18 is purposely left open so that a filter or an auxiliary lens, such as the auxiliary lens 34 may be conveniently positioned in the housing 18. Once an auxiliary lens 34 or the like has been positioned in the housing 18, it is retained in the housing 18 by an upper circumferential portion in the form of a cover 36. The cover 36 is easily secured as at 38 to one end of the circumferential portion 22. The cover 36 includes a strap portion 40 at its opposite end which is separately connected to the opposite end portion of the circumferential portion 22 by a latch member 42 secured to the circumferential portion 22. It will be understood that the structure of the hinge and the latch member may be any desired.

In order that a lens or a filter may be partially ejected from the housing 18 upon the movement of the cover 36 to an open position, there is mounted in the lower portion of the housing 18 in opposed relation to the cover 36 an ejecting spring 44. The ejecting spring 44 is in the form of a leaf spring and one end thereof is secured to the circumferential portion 22 by a fastener 46. It will be understod that the ejector spring 44 has sufficient strength to eject a lens or a filter partially out of the housing 18 so that it may be firmly grasped between one's fingers to completely remove the lens or filter from the housing 18. Inasmuch as each lens or filter is provided with a frame, such as the frame 48 of the auxiliary lens 34, the lens or filter may be removed from the housing 18 without one's fingers touching the surface thereof.

Referring now to Figure 6 in particular, it will be seen that there is illustrated a lens adapter 16 which includes a housing 18 having a modified form of circumferential portion 50. The circumferential portion 50 has formed in the bottom part thereof a depending boss 52 which includes an upwardly open seat 54. Seated in the seat 54 and projecting into the interior of the housing 18 is a coil spring which forms an ejector spring 56. It will be understood that the ejector spring 56 functions in the same manner as the ejector spring 44 although it is of a different design.

It is to be noted that no provision has been made for the attachment of a sunshade to the lens adapter 16. However, if so desired, the front wall 24 thereof may be externally threaded to permit the positioning of a sunshade (not shown) thereon.

Although the ejector spring 56 of Figure 6 has been illustrated as a compression spring, if so desired, it may be replaced by a depending tension spring. A tension spring will, of course, be attached to a plunger which would engage a lens mounted within the lens adapter.

It is to be understood that although the lens adapter has been limited in illustration and description to a camera, the invention is not intended to be so limited. It is readily apparent that the lens adapter may be utilized with projectors, enlargers and other optical equipment which normally require a lens adapter.

In view of the foregoing, it will be seen that there has been devised a lens adapter which may be secured to a lens housing of a camera in a conventional manner and which is so constructed and designed whereby a lens or filter may be quickly and easily removed therefrom or replaced therein by merely unlatching the cover 36 and swinging it to an open position. Further, it will be seen that the lens adapter is so constructed whereby lenses and filters of different thickness may be conveniently mounted therein.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A lens adapter for cameras comprising a housing, an adapter ring carried by said housing for attaching said housing to a camera lens, said housing being shaped to removably receive an auxiliary lens, a circumferential cover portion of said housing being hingedly attached to said housing to permit the insertion of an auxiliary lens, latch means for retaining said circumferential cover portion in a lens retaining position, said housing having an annular front wall mounted for forward movement to facilitate the mounting of lenses of various thicknesses in said housing, spring means carried by said housing urging said front wall rearwardly, spring means mounted in said housing in opposed relation to said circumferential cover portion for urging a lens out of said housing to effect removal of a lens.

References Cited in the file of this patent

UNITED STATES PATENTS

| | | |
|---|---|---|
| 1,057,262 | Oldfield | Mar. 25, 1913 |
| 1,111,093 | Preddy | Sept. 22, 1914 |
| 1,780,384 | Green | Nov. 4, 1930 |
| 2,352,844 | Leobe | July 4, 1944 |
| 2,520,432 | Robertson | Aug. 29, 1950 |